United States Patent
Vainer et al.

(10) Patent No.: US 11,681,550 B2
(45) Date of Patent: Jun. 20, 2023

(54) COMMAND MANAGEMENT USING ALLOCATED COMMAND IDENTIFIER POOLS

(71) Applicant: Western Digital Technologies, Inc., San Jose, CA (US)

(72) Inventors: Albert Vainer, Netanya (IL); Itay Presiado, Holon (IL); Ido Naveh, HaOgen (IL)

(73) Assignee: Western Digital Technologies, Inc., San Jose, CA (US)

( * ) Notice: Subject to any disclaimer, the term of this patent is extended or adjusted under 35 U.S.C. 154(b) by 193 days.

(21) Appl. No.: 17/176,445

(22) Filed: Feb. 16, 2021

(65) Prior Publication Data

US 2022/0100562 A1 Mar. 31, 2022

Related U.S. Application Data

(60) Provisional application No. 63/084,148, filed on Sep. 28, 2020.

(51) Int. Cl.
*G06F 9/50* (2006.01)
*G06F 9/48* (2006.01)

(52) U.S. Cl.
CPC .......... *G06F 9/50* (2013.01); *G06F 9/48* (2013.01); *G06F 9/4843* (2013.01); *G06F 9/4881* (2013.01); *G06F 9/5005* (2013.01); *G06F 2209/5011* (2013.01)

(58) Field of Classification Search
CPC ........ G06F 9/50; G06F 9/5027; G06F 9/4843; G06F 2209/5011; G06F 2209/5018
See application file for complete search history.

(56) References Cited

U.S. PATENT DOCUMENTS

| | | | |
|---|---|---|---|
| 2007/0276833 A1* | 11/2007 | Sen | G06F 16/22 |
| 2010/0262720 A1* | 10/2010 | Daly, Jr | G06F 13/4022 710/5 |
| 2016/0274929 A1* | 9/2016 | King | G06F 9/5011 |
| 2020/0050376 A1* | 2/2020 | Wokhlu | G06F 3/0673 |

\* cited by examiner

*Primary Examiner* — Charles M Swift
(74) *Attorney, Agent, or Firm* — Patent Law Works LLP

(57) ABSTRACT

Systems and methods for threaded computing systems using allocated command identifier pools for command management are described. Command requests for different processing threads are received. Based on the thread assigned to process the command request, command identifiers are assigned from different pools of command identifiers for each thread, where each pool contains non-overlapping sets of command identifiers. The command identifiers are returned to the same pool that the command identifier came from upon completion of each command.

20 Claims, 8 Drawing Sheets

COMMAND MANAGEMENT USING ALLOCATED COMMAND IDENTIFIER POOLS

TECHNICAL FIELD

The present disclosure generally relates to command management in computing systems and, more particularly, to assigning command identifier in threaded computing environments.

BACKGROUND

Computing systems include memory and storage devices that process read and write operations for storing data on storage media, such as non-volatile memory devices. With increasing data and transactional loads to support data and computation-intense applications, the speed of these read/write operations may be a critical metric in driving computing system efficiency and reliability.

In some systems, such as those with multiple central processing unit (CPU) cores, computing operations, such as read/write operations, may be processed in threads, where each thread is mapped to specific computational resources, such as a specific CPU core. These threads may each be executed in their specific cores with high-levels of independence, often with separate operating contexts that enable them to efficiently process their thread with as little synchronization across threads as possible.

However, these independent process threads may still be part of a larger, coordinated operation, such as a related set of read/write commands. They may also operate on shared resources, like the same target memory device. In this case, it may be important to manage the commands executed in each independent context in such a way that no conflicts are created when interacting with shared resources, such as the originating command generator or the target memory device. Computing systems may use unique command identifiers, such as a serial set of numbers, to differentiate between and manage commands.

In some systems, each processing thread may use native command management to assign locally unique command identifiers to the commands in their context. However, this may lead to conflicts where each command manager assigns identifiers from a similar pool of command identifiers and multiple commands with the same command identifier (from different threads) may end up in transit to a common resource at the same time.

To address this potential conflict, a synchronization mechanism may be used with a global pool of command identifiers. For example, each thread may "check-out" a globally unique command identifier from a common pool and be assured that no other thread or command is using that command identifier. Synchronization may require runtime access to a common resource for managing the global pool of command identifiers and lag related to locking and returning command identifiers from the common pool.

While this synchronization lag may seem minimal, it may have a significant impact on the performance of the threaded computing system. There is a need for command management for threaded systems that prevents conflicts across threaded computing contexts while improving performance over synchronization with a global pool of command identifiers.

SUMMARY

Various aspects for command management in threaded computing systems, particularly using pre-allocated pools of command identifiers, are described.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions or operations. One general aspect includes a system that includes a processor, a memory, and a command manager stored in the memory and executable by the processor to: receive a first command request for initiating a first command for a first thread selected from a plurality of threads; assign, based on the first thread, a first command identifier from a first pool of command identifiers to the first command, where each thread from the plurality of threads has a different associated pool of command identifiers; and return, upon completion of the first command, the first command identifier to the first pool of command identifiers.

Implementations may include one or more of the following features. The system may include an identifier manager stored in the memory and executable by the processor to: determine a global pool of command identifiers, where the global pool includes a total number of command identifiers; determine a number of threads corresponding to the plurality of threads; and allocate the total number of command identifiers among a plurality of associated pools of command identifiers, where each thread of the plurality of threads corresponds to an associated pool of command identifiers from the plurality of associated pools of command identifiers, and each associated pool of command identifiers includes non-overlapping sets of command identifiers relative to each other associated pool of command identifiers. The total number of command identifiers may be at least a maximum number of concurrent commands for a target system multiplied by the number of threads and each associated pool of command identifiers includes a number of unique command identifiers equal to at least the maximum number of concurrent commands. The system may include a configuration interface stored in the memory and executable by the processor to: determine the total number of command identifiers; determine the number of threads; and configure, using the total number of command identifiers and the number of threads, the plurality of associated pools of command identifiers. The system may include a plurality of circular queues stored in the memory, where each circular queue corresponds to a different associated pool of command identifiers. The command manager may be further executable to: pop, from a first circular queue for the first pool of command identifiers, a next command identifier to assign as the first command identifier; and push, to the first circular queue, the first command identifier to return the first command identifier to the first pool of command identifiers. Each circular queue of the plurality of circular queues may include: a buffer space in the memory containing a number of cells equal to a number of command identifiers in that circular queue; a first pointer indicating a next command identifier to assign; and a second pointer indicating a target cell for a returning command identifier. The system may include: a storage interface configured for communication with a target memory device; and a command generator in communication with the storage interface and configured to generate a plurality of read/write commands to the target memory device, and send a plurality of command requests, including the first command request, to the command manager. The plurality of read/write commands may be distributed among the plurality of threads, each thread of the plurality of threads may operate in a separate context that is unaware of each other thread among the plurality of threads, and the command manager may be further executable to assign unique command identifiers to each read/write command of the plurality of read/write commands without synchronization across command identifier assignments for the plurality of threads. The system may include a plurality of central processing unit cores, where each central processing unit core corresponds to a corresponding thread from the plurality of threads and the command manager and the storage interface are configured as drivers operating in a kernel space of an operating system instantiated in the plurality of central processing unit cores.

Another general aspect includes a computer-implemented method that includes: receiving a first command request for initiating a first command for a first thread selected from a plurality of threads; assigning, based on the first thread, a first command identifier from a first pool of command identifiers to the first command, where each thread from the plurality of threads has a different associated pool of command identifiers; and returning, upon completion of the first command, the first command identifier to the first pool of command identifiers.

Implementations may include one or more of the following features. The computer-implemented method may include: determining a global pool of command identifiers, where the global pool includes a total number of command identifiers; determining a number of threads corresponding to the plurality of threads; and allocating the total number of command identifiers among a plurality of associated pools of command identifiers, where each thread of the plurality of threads corresponds to an associated pool of command identifiers from the plurality of associated pools of command identifiers, and each associated pool of command identifiers includes non-overlapping sets of command identifiers relative to each other associated pool of command identifiers. The total number of command identifiers may be at least a maximum number of concurrent commands for a target system multiplied by the number of threads, and each associated pool of command identifiers may include a number of unique command identifiers equal to at least the maximum number of concurrent commands. The computer-implemented method may include: determining the total number of command identifiers; determining the number of threads; and configuring, using the total number of command identifiers and the number of threads, the plurality of associated pools of command identifiers. The computer-implemented method may include: selecting a first circular queue from a plurality of circular queues stored in memory, where each circular queue corresponds to a different associated pool of command identifiers; and storing the first pool of command identifiers in the first circular queue. The computer-implemented method may include: popping, from the first circular queue for the first pool of command identifiers, a next command identifier to assign as the first command identifier; and pushing, to the first circular queue, the first command identifier to return the first command identifier to the first pool of command identifiers. Each circular queue of the plurality of circular queues may include: a buffer space in a memory containing a number of cells equal to a number of command identifiers in that circular queue; a first pointer indicating a next command identifier to assign; and a second pointer indicating a target cell for a returning command identifier. The computer-implemented method may include: generating a plurality of read/write commands to a target memory device; and sending a plurality of command requests, including the first command request, for the plurality of read/write commands to a command manager for assigning command identifiers. The plurality of read/write commands may be distributed among the plurality of threads; each thread of the plurality of threads may operate in a separate context that is unaware of each other thread among the plurality of threads; and the command manager may assign unique command identifiers to each read/write command of the plurality of read/write commands without synchronization across command identifier assignments for the plurality of threads.

Still another general aspect includes a system that includes a processor; a memory; means for receiving a first command request for initiating a first command for a first thread selected from a plurality of threads; means for assigning, based on the first thread, a first command identifier from a first pool of command identifiers to the first command, where each thread from the plurality of threads has a different associated pool of command identifiers; and means for returning, upon completion of the first command, the first command identifier to the first pool of command identifiers.

The various embodiments advantageously apply the teachings of threaded computing systems to improve the functionality of such computer systems. The various embodiments include operations to overcome or at least reduce the issues previously encountered in threaded computing systems and, accordingly, are more reliable and/or efficient than other high-performance computing systems. That is, the various embodiments disclosed herein include hardware and/or software with functionality to improve the efficient command management in threaded computing systems, such as by using pre-allocated pools of command identifiers for each thread context and related set of input/output (I/O) commands. Accordingly, the embodiments disclosed herein provide various improvements to threaded computing systems.

It should be understood that language used in the present disclosure has been principally selected for readability and instructional purposes, and not to limit the scope of the subject matter disclosed herein.

DETAILED DESCRIPTION

Figure 1:
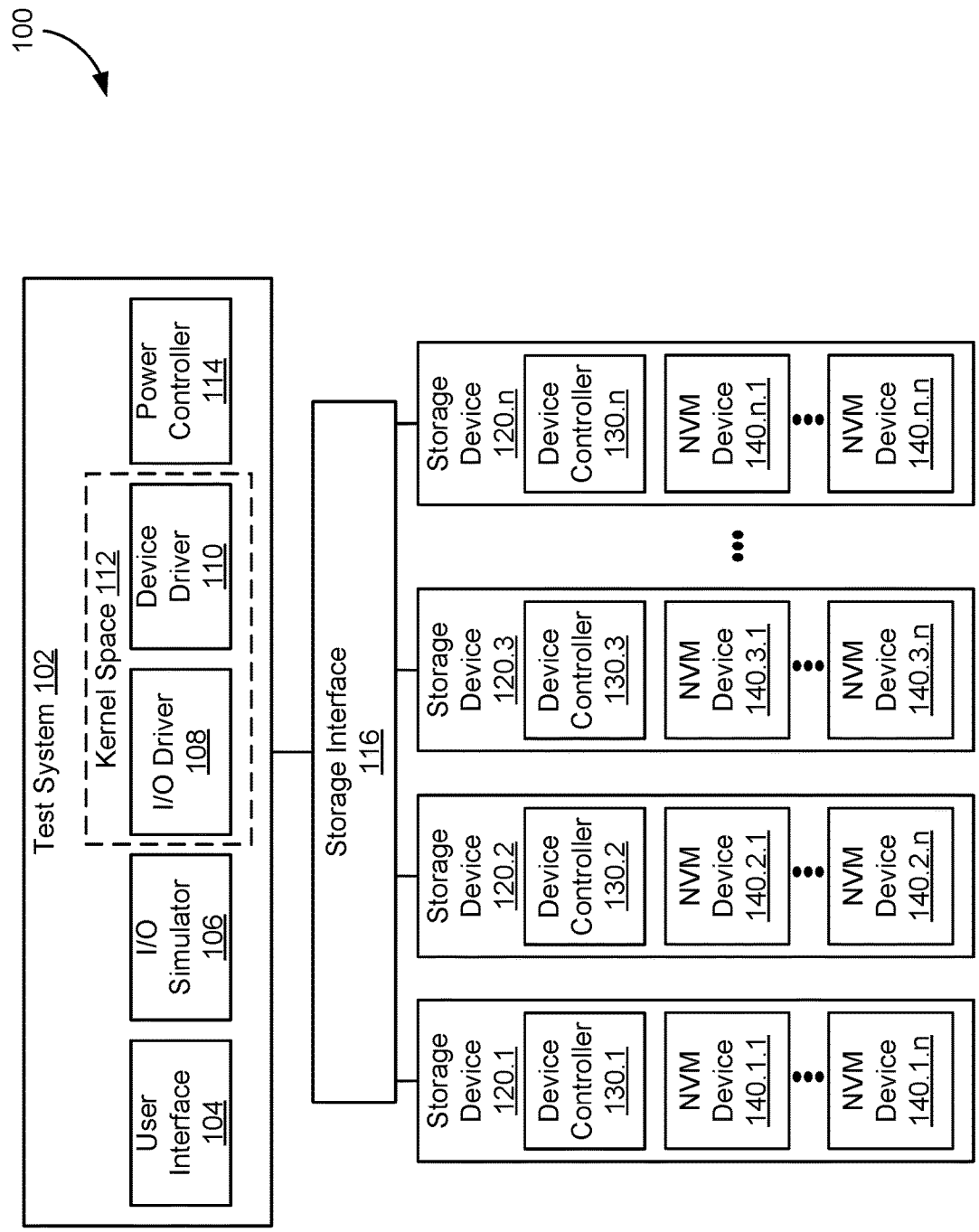
FIG. 1 schematically illustrates a computing system for I/O testing of storage devices.

FIG. 1 shows an embodiment of an example data storage system 100 configured for testing storage devices 120, such as solid-state drives (SSDs) using non-volatile memory for data storage. While some example features are illustrated, various other features have not been illustrated for the sake of brevity and so as not to obscure pertinent aspects of the example embodiments disclosed herein. To that end, as a non-limiting example, data storage system 100 includes one or more data storage devices 120 (also sometimes called information storage devices, storage devices, or disk drives) configured for input/output operations from a host system, such as test system 102. In some embodiments, storage devices 120 may be configured in storage nodes, such as blades, rack servers, storage arrays, or similar storage units for use in data center storage racks or chassis. Storage devices 120 may support one or more applications and provide data storage and retrieval capabilities for host systems, such as test system 102.

In the embodiment shown, each of the storage devices 120 may be attached to a storage interface 116. For example, storage devices 120 may share a common rack, unit, or chassis in a data center that provides a backplane interface for enabling physical, logical, and/or power connections to storage devices 120. In some embodiments, storage devices 120 may share storage interface 116, network switch(es), and/or other hardware and software components for connecting to test system 102 over an isolated network that does not use the general network and interface bandwidth of test system 102. In some embodiments, storage interface 116 may include one or more bus interfaces between test system 102 and storage devices 120. For example, storage interface 116 may include a plurality of physical port connections to storage devices 120 that define physical, transport, and other logical channels for establishing communication with the different components and subcomponents thereof using one or more interface standards and corresponding protocols. These physical connections may include one or more Ethernet connections, peripheral component interconnect express (PCIe), fibre channel (FC), serial attached small computer storage interface (SAS), etc., as well as combinations thereof. In some embodiments, the interconnections between test system 102 and storage devices 120 may be configured as an interconnect fabric supported by a fabric interconnect protocol, such as non-volatile memory express over fabric (NVMe-oF).

Test system 102 may include an application or module in an information technology (IT) system for accessing storage system 100 to store, read, or otherwise manage data therein, and, more specifically, conduct input/output modelling and monitoring for testing storage devices 120 in various high-performance I/O scenarios. In some embodiments, test system 102 may be a computing system, such as a general-purpose computer configured as an application server, a personal computer, a laptop, a tablet, a wireless telephone, a personal digital assistant or any other type of communication device that is able to interface with the storage system 100 and communicate through storage interface 116.

In some embodiments, test system 102 may include a user interface 104, an I/O simulator 106, an I/O driver 108, a device driver 110, and/or a power controller 114. For example, these components may be software and/or hardware modules that support an I/O test application hosted on test system 102. User interface 104 may include a graphical user interface and/or one or more application protocol interfaces (APIs) that allow a user to access the configuration settings and testing functions of test system 102. For example, user interface 104 may include a web-based graphical user interface accessed through a web browser using secure internet protocols for accessing the storage testing functions of storage system 100.

In some embodiments, user interface 104 may provide access to I/O simulator 106. I/O simulator 106 may include functions, data structures, and interfaces for configuring I/O scenarios or patterns for testing against one or more target storage devices among storage devices 120. For example, I/O simulator 106 may enable a user to identify data locations, data patterns, and/or related parameters for the input data for a particular test or simulation, as well as defining other operational parameters and/or configuration parameters for a desired I/O scenario. I/O simulator 106 may also be used to define other parameters of a test session, such as duration, operating parameters to be monitored, output data locations, error handling, etc. In some embodiments, I/O simulator 106 may define a set of storage operations and/or corresponding commands for a test scenario, generate a corresponding set of storage commands, and provide the set of storage commands to the I/O driver for execution against storage devices 120.

In some embodiments, I/O driver 108 may include an operating system driver for executing precise and high-speed storage commands targeting one or more storage devices 120 accessible over storage interface 116. For example, I/O driver 108 may include a high-performance pattern generator for complex non-volatile memory express (NVMe) I/O commands, as well as a data tracking engine for monitoring inputs, outputs, and other storage device parameters. In some embodiments, I/O driver 108 may be configured to operate entirely within kernel space 112 of an operating system, such as a Windows driver that operates as a system service within the core of the operating system and is separate and, generally, receives dedicated and/or higher priority resource allocation than user applications. In some embodiments, I/O driver 108 may support multiple APIs for supporting different system types and user application interfaces. For example, in addition to supporting simulation calls from I/O simulator 106, I/O driver 108 may support other system utilities and/or production applications to provide I/O management services. In another example, APIs may be provided for supporting configuration of system or driver parameters and/or access to or from services within I/O driver 108, such as queue management, arbitration, command identification, registry access, etc.

In some embodiments, I/O driver 108 may include a set of system configuration parameters related to the configuration of the central processing unit (CPU) cores, threading, concurrent commands, queue configurations, interrupts, and other system configuration parameters. For example, the set of system configuration parameters may be configured at installation of I/O driver 108 to support the system configuration of test system 102 or a similar host system and its operating system. In some embodiments, I/O driver 108 may include an API for receiving runtime parameters for a given I/O sequence or set of storage commands and/or related I/O monitoring from I/O simulator 106 or a similar application. For example, each time a user of I/O simulator 106 runs a simulation scenario or similar job or session, runtime parameters for the set of storage commands needed may be received by I/O driver 108 from I/O simulator 106. In some embodiments, I/O driver 108 may include an API for sending threaded storage commands from a plurality of command queues through a storage device driver, such as device driver 110, for providing the commands through storage interface 116 according to the storage interface standards and protocols used by the target storage devices. For example, I/O driver 108 may provide storage commands to device driver 110 and device driver 110 may package those commands in accordance with a storage interface standard, such as NVMe.

In some embodiments, device driver 110 may include a set of hardware and operating system dependent functions for accessing storage devices 120 attached to storage interface 116. For example, device driver 110 may be configured as an operating system specific driver for a storage interface protocol, such as a Windows driver for NVMe storage devices connected via a host bus and PCIe, FC, SAS, or similar interface connection through storage interface 116. In some embodiments, device driver 110 may be configured to operate entirely within kernel space 112 of an operating system and operate in the same processing context as I/O driver 108. In some embodiments, device driver 110 may present one or more APIs for exchanging parameters, run-time information, and/or service calls with I/O driver 108.

In some embodiments, power controller 114 may include hardware and/or software for controlling a power signal or power source for storage devices 120. For example, power controller 114 may be in communication with test system 102 through a PCIe, USB, and/or wireless connection for receiving control signals to simulate power loss, power cycles, and similar power-related events for storage devices 120. Power controller 114 may include a plurality of power ports to connect to the power supply interfaces to storage devices 120, through storage interface 116 or using an external set of power connections.

In some embodiments, the data storage devices 120 are, or include, solid-state drives (SSDs). Each data storage device 120.1-120.*n* may include a non-volatile memory (NVM) or device controller 130 based on compute resources (processor and memory) and a plurality of NVM or media devices 140 for data storage (e.g., one or more NVM device(s), such as one or more flash memory devices). In some embodiments, a respective data storage device 120 of the one or more data storage devices includes one or more NVM controllers 130, such as flash controllers or channel controllers (e.g., for storage devices having NVM devices in multiple memory channels). In some embodiments, data storage devices 120 may each be packaged in a housing, such as a multi-part sealed housing with a defined form factor and ports and/or connectors for interconnecting with storage interface 116.

In some embodiments, a respective data storage device 120 may include a single medium device while in other embodiments the respective data storage device 120 includes a plurality of media devices. In some embodiments, media devices include NAND-type flash memory or NOR-type flash memory. In some embodiments, data storage device 120 includes one or more hard disk drives (HDDs). In some embodiments, data storage devices 120 may include a flash memory device, which in turn includes one or more flash memory die, one or more flash memory packages, one or more flash memory channels or the like. However, in some embodiments, one or more of the data storage devices 120 may have other types of non-volatile data storage media (e.g., phase-change random access memory (PCRAM), resistive random access memory (ReRAM), spin-transfer torque random access memory (STT-RAM), magneto-resistive random access memory (MRAM), etc.).

In some embodiments, each storage device 120 includes a device controller 130, which includes one or more processing units (also sometimes called CPUs or processors or microprocessors or microcontrollers) configured to execute instructions in one or more programs. In some embodiments, the one or more processors are shared by one or more components within, and in some cases, beyond the function of the device controllers. NVM media devices 140 are coupled to the device controllers through connections that typically convey commands in addition to data, and optionally convey metadata, error correction information and/or other information in addition to data values to be stored in media devices and data values read from media devices. NVM media devices 140 may include any number (i.e., one or more) of memory devices including, without limitation, non-volatile semiconductor memory devices, such as flash memory device(s).

In some embodiments, media devices 140 in storage devices 120 are divided into a number of addressable and individually selectable blocks, sometimes called erase blocks. In some embodiments, individually selectable blocks are the minimum size erasable units in a flash memory device. In other words, each block contains the minimum number of memory cells that can be erased simultaneously (i.e., in a single erase operation). Each block is usually further divided into a plurality of pages and/or word lines, where each page or word line is typically an instance of the smallest individually accessible (readable) portion in a block. In some embodiments (e.g., using some types of flash memory), the smallest individually accessible unit of a data set, however, is a sector or codeword, which is a subunit of a page. That is, a block includes a plurality of pages, each page contains a plurality of sectors or codewords, and each sector or codeword is the minimum unit of data for reading data from the flash memory device.

A data unit may describe any size allocation of data, such as host block, data object, sector, page, multi-plane page, erase/programming block, media device/package, etc. Storage locations may include physical and/or logical locations on storage devices 140 and may be described and/or allocated at different levels of granularity depending on the storage medium, storage device/system configuration, and/or context. For example, storage locations may be allocated at a host logical block address (LBA) data unit size and addressability for host read/write purposes but managed as pages with storage device addressing managed in the media flash translation layer (FTL) in other contexts. Media segments may include physical storage locations on media devices 140, which may also correspond to one or more logical storage locations. In some embodiments, media segments may include a continuous series of physical storage location, such as adjacent data units on a storage medium, and, for flash memory devices, may correspond to one or more media erase or programming blocks. A logical data group may include a plurality of logical data units that may be grouped on a logical basis, regardless of storage location, such as data objects, files, or other logical data constructs composed of multiple host blocks.

In some embodiments, storage controllers (not shown) may be coupled to respective data storage devices 120. For example, a storage node may be configured as a storage blade or similar storage unit comprising a plurality of interface slots for storage devices 120. Storage controllers may include NVMe interface cards with interface ports for NVMe compatible storage devices, such as storage devices with NVMe interfaces and onboard remote direct memory access (RDMA) engines. In some embodiments, storage controllers may be coupled to respective data storage devices 120 through backplane network that includes storage interface 116. However, in some embodiments, storage controllers may be hosted as a component and/or a subsystem of another component of data storage system 100. For example, in some embodiments, some or all of the functionality of storage controllers may be implemented by hardware and software for defining a protocol-based storage interface executed on one or more compute resources in test system 102 or another storage system in communication with test system 102. Storage controllers are sometimes called a controller system, a main controller system, a non-volatile memory express (NVMe) controller, garbage collection (GC) leader, or storage virtualization controller (SVC).

In some embodiments, one or more components of test system 102, storage interface 116, and/or storage devices 120 may be interconnected via a network. The network may include a wired and/or wireless network (e.g., public and/or private computer networks in any number and/or configuration) which may be coupled in a suitable way for transferring data. For example, the network may include any means of a conventional data communication network such as a local area network (LAN), a wide area network (WAN), a telephone network, such as the public switched telephone network (PSTN), an intranet, the internet, or any other suitable communication network or combination of communication networks. Data can be transferred between test system 102, other host systems (not shown), storage interface 116, and/or storage devices 120 by means of a variety of network protocols, including transmission control protocol (TCP), remote direct memory access (RDMA), RDMA over converged Ethernet (RoCE), NVMe over fabric (NVMe-oF), hypertext transfer protocol (HTTP)/representational state transfer (REST) object interfaces, language-specific interfaces such as Microsoft .Net, Python or C, etc.

Figure 2:
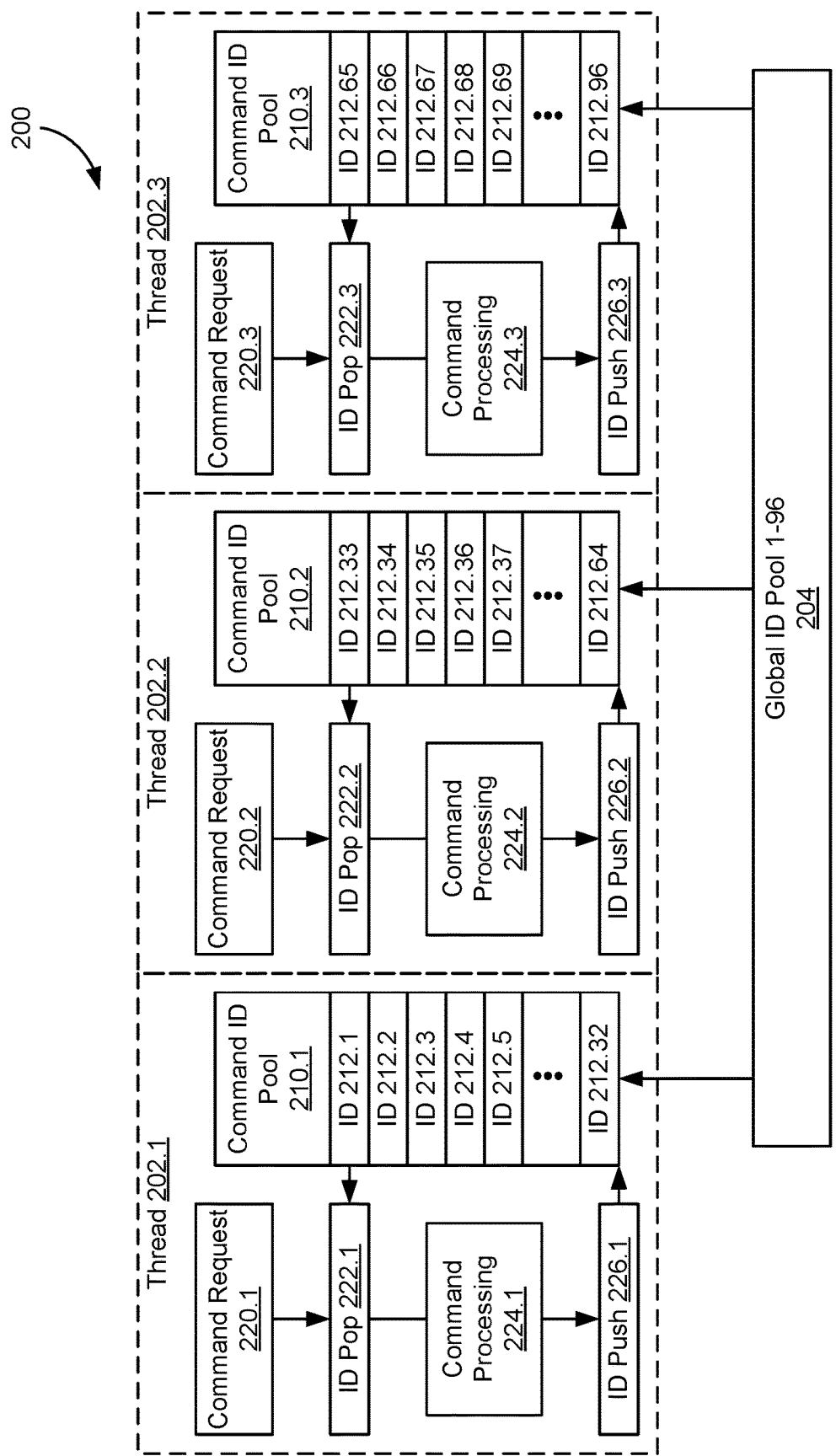
FIG. 2 schematically illustrates an allocated command identifier pool architecture that may be used by the system of FIG. 1.

FIG. 2 shows an embodiment of an example allocated command identifier pool system 200. Pool system 200 may be implemented in a storage system, such as storage system 100 in FIG. 1, for more reliably and efficiently handling storage commands in a threaded system to reduce latency in the command identifier assignment operation. For example, I/O driver 108 may implement system 200 to manage multiple processing threads and command queues during I/O simulation runtime. In the configuration shown, I/O driver 108 may receive or generate a plurality of command requests, such as the set of command requests corresponding to an I/O pattern or scenario to be tested. Test system 102 may be configured for a determined number of threads, such as threads 202.1-202.3, and a determined number of global command identifiers, such as global identifier pool 204, containing command identifiers 1-96. In the example shown, global ID pool 204 may be divided evenly among threads 202 to provide separate command ID pools 210.1-210.2 and command requests 220 may be assigned runtime command identifiers from the respective command ID pool 210 for the threaded context in which the command request will be processed.

Command ID pools 210 may each be instantiated in a memory resource allocated to the specific thread for processing by a processor responsible for that thread. For example, command ID pool 210.1 may be instantiated in the operating memory associated with a particular central processing unit (CPU) core in a multi-cored system, where the particular CPU is assigned processing tasks for thread 202.1. Similarly, command ID pool 210.2 may be instantiated in the operating memory associated with thread 202.2 and command ID pool 210.3 may be instantiated in the operating memory associated with thread 202.3. Each associated pool may be associated with a particular thread and, thereby, a particular CPU core. In some embodiments, the memory subsystem hosting each command ID pool may be hardware resources dedicated to their respective CPU cores or may from a shared memory subsystem where memory space has been allocated to the respective CPU cores for access without interference across threads.

Each allocated command ID pool 210 may contain a unique set of command IDs from global ID pool 204. For example, command identifiers may be configured as globally unique identifiers comprised of a numeric value, string of alphanumeric characters of a predetermined length, a multi-part identifier, or a combination thereof, where each command ID is a unique combination that may be attached to and/or associated with a command to differentiate from all other commands presently running in the system. Global ID pool 204 may include a determined number of unique ID values and each command ID pool 210 may include a subset selected from the determined number of unique ID values where no two command ID pools contain the same command ID. For example, global ID pool 204 may include command IDs 1-96, command ID pool 210.1 may include command IDs 212.1-212.32 (1-32), command ID pool 210.2 may include command IDs 212.33-212.64 (1-64), and command ID pool 210.3 may include command IDs 212.65-212.96 (65-96). In some embodiments, each thread 202 and command ID pool 210 may operate in separate contexts without requiring any synchronization across command identifier assignments.

At runtime, as each command request is generated or received, it may be assigned to one of threads 202 for processing. For example, command request 220.1 may be assigned to thread 202.1, command request 220.2 may be assigned to thread 202.2, and command request 220.3 may be assigned to thread 202.3. In order to assign each command a command identifier within the context of the respective threads, each command request 220 may initiate an ID pop function 222 to select a command identifier 212 from the respective command ID pool 210 and assign it to the command. For example, command request 220.1 may initiate ID pop function 222.1 to select command ID 212.1 and assign it to the command in command request 220.1, command request 220.2 may initiate ID pop function 222.2 to select command ID 212.33 and assign it to the command in command request 220.2, and command request 220.3 may initiate ID pop function 222.3 to select command ID 212.65 and assign it to the command in command request 220.3.

Command processing 224 may be executed for command requests 220 may be executed in their respective thread contexts. For example, the computing resources assigned to thread 202.1 may process the command from command request 220.1 using command ID 212.1, the computing resources assigned to thread 202.2 may process the command from command request 220.2 using command ID 212.33, and the computing resources assigned to thread 202.3 may process the command from command requests 220.3 using command ID 212.65. Even if command processing 224 includes accessing shared resources, such as queuing on another thread and/or an API to a resource external to the I/O driver, such as the device driver and/or target storage device for the command, no conflicts will arise between the commands as they pass through or access those shared resources. Commands may take different times to process and, depending on queuing, priority, resource availability, and other considerations, may be processed and returned at different times and/or in a different order than they were initiated.

Command processing 224 for each command may complete (or generate an error) and initiate the return of the command identifier when it is no longer needed (making it available for future commands). Upon completion of each command, an ID push function 226 may return the command identifier for that command to their respective command ID pools 210. For example, upon completion of command processing 224.1 ID push function 226.1 may return command ID 212.1 to an available slot in command ID pool 210.1, upon completion of command processing 224.2 ID push function 226.2 may return command ID 212.33 to an available slot in command ID pool 210.2, and upon completion of command processing 224.3 ID push function 226.3 may return command ID 212.65 to an available slot in command ID pool 210.3.

Figure 3:
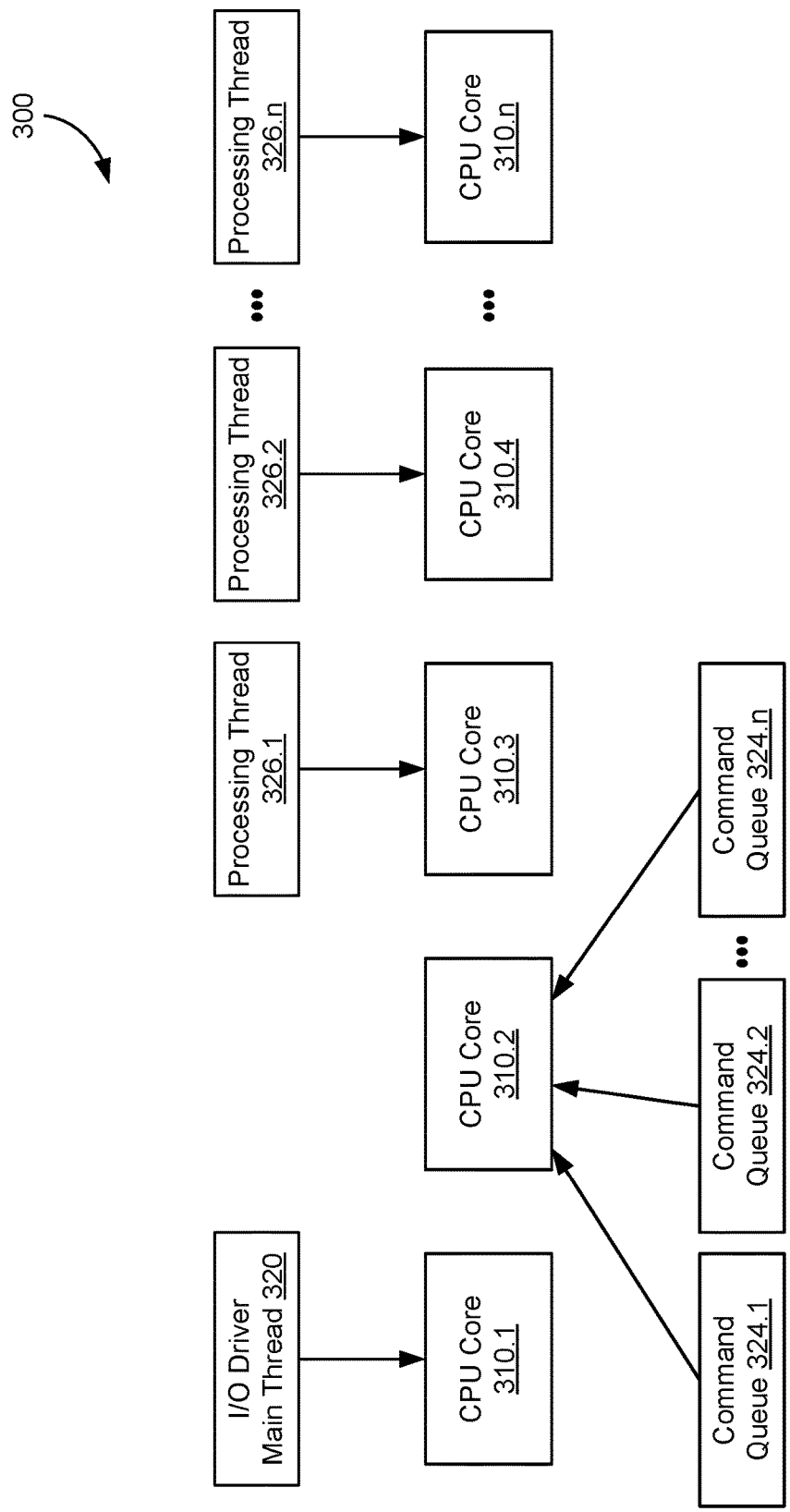
FIG. 3 schematically illustrates a threaded core processing architecture that may be used by the system of FIG. 1.

FIG. 3 shows a schematic representation of a threaded multicore processing system 300, such as may be used by test system 102 or another host system for I/O driver 108. Multicore system 300 may include any number of CPU cores 310. I/O driver 108 may be allocated a subset of CPU cores 310 for managing and executing I/O operations or processes.

In some embodiments, each CPU core 310.1-310.*n* may include a dedicated processor and limited memory resources, such as a set of registers and cache memory. Each CPU core 310 may operate in its own computing context and process mapped operations without interference from other CPU cores, except insofar as those operations access a shared resource or include a dependency on an operation in another context (which is a shared or external resource to the context of the originating CPU core). CPU cores 310 may be interconnected by a bus and may provide access to local memory and one or more I/O interfaces, such as the storage interface managed by device driver 110. An example bus, not shown, may include one or more conductors that permit communication among the CPU cores 310 and other resources of multicore system 300. The processors of CPU cores 310 may include any type of conventional processor or microprocessor that interprets and executes instructions. The local memory accessible to CPU cores 310 may include a random-access memory (RAM) or another type of dynamic storage device that stores information and instructions for execution by CPU cores 310 and/or a read only memory (ROM) or another type of static storage device that stores static information and instructions for use by CPU cores 310.

In some embodiments, I/O driver 108, in conjunction with operating system services for allocating operations among CPU cores 310 may allocate or map specific operations to different CPU cores 310. For example, an I/O driver main thread 320 may be allocated to CPU core 310.1 to provide overall API and management operations for the I/O driver. Management of I/O command queues may be mapped to CPU core 310.2 to allow a plurality of command queues 324.1-324.*n* to be managed in a dedicated computing context. Command queues 324.1-324.*n* may correspond to processing threads 326.1-326.*n*, where each processing thread 326 is mapped to a different CPU core 310. For example, processing thread 326.1 may be mapped to CPU core 310.2, processing thread 326.2 may be mapped to CPU core 310.4, etc. I/O driver 108 may be allocated a subset of CPU cores 310 to support storage command processing and manage a determined number of processing threads 326 for any given system, configuration, and/or session. In some embodiments, each of the CPU cores 310 may process the commands or operations within their context while being unaware of the processing occurring in the other CPU cores 310. For example, each CPU core may process its commands according to internal logic, resources, and queuing without entanglements or dependencies on operations in other CPU cores.

Figure 4:
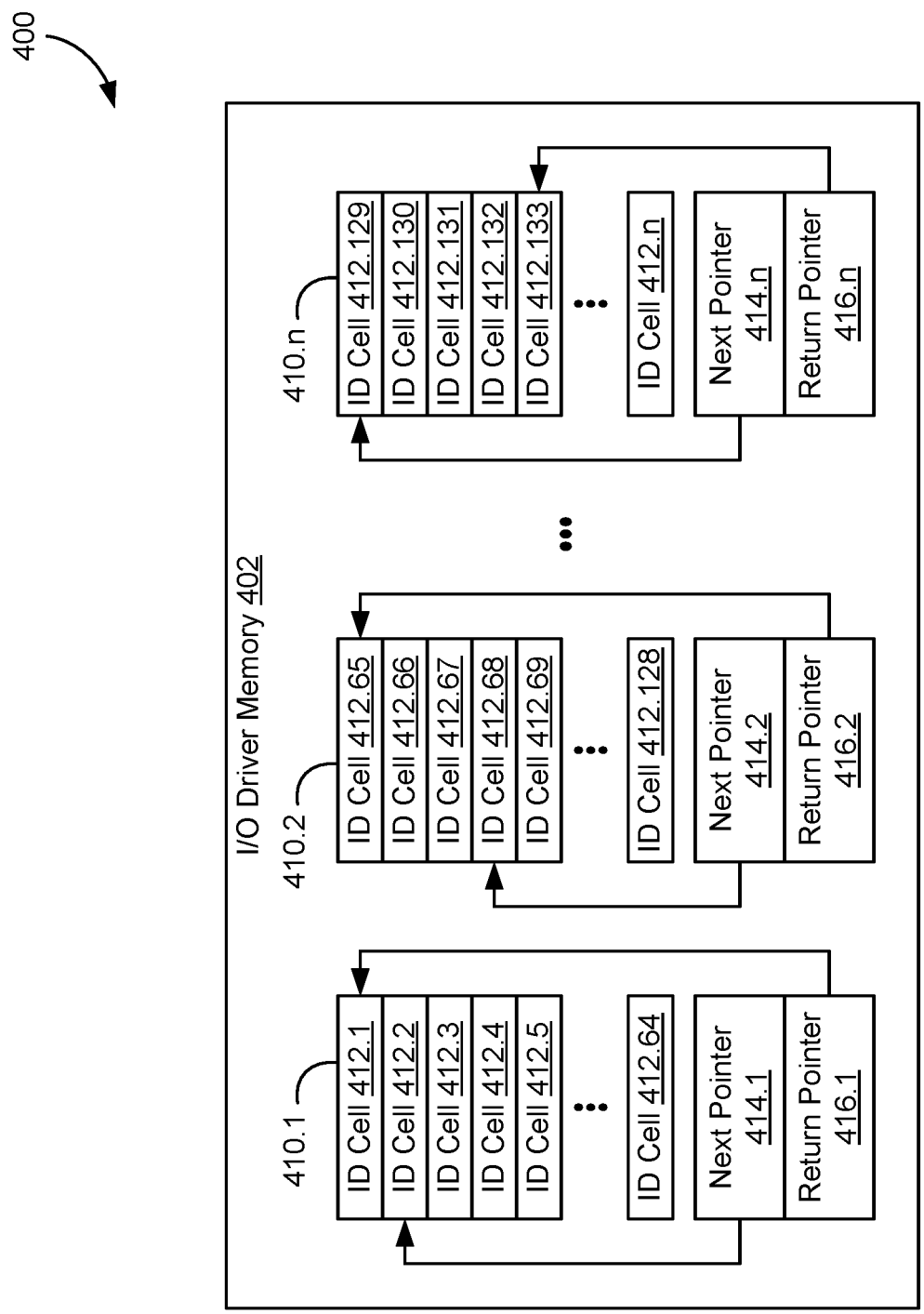
FIG. 4 schematically illustrates a circular queue architecture that may be used for the allocated command identifier pools of FIG. 2.

FIG. 4 shows a schematically illustrates a circular queue system 400 that may be used for allocated command identifier pools, such as the allocated command ID pools 210 in FIG. 2. In some embodiments, circular queue system 400 may be instantiated in an I/O driver memory, such as a memory location allocated to I/O driver 108 in FIG. 1. For example, I/O driver memory 402 may use system memory and/or buffer memory allocated to each processing thread and associated context. In some embodiments, I/O driver memory 402 may include a plurality of circular queues 410 corresponding to the number of processing threads mapped to executing storage commands or operations. For example, I/O driver 108 running on multicore system 300 may include circular queue 410.1 corresponding to processing thread 326.1, circular queue 410.2 corresponding to processing thread 326.2, and circular queue 410.*n* corresponding to processing thread 326.*n*.

In some embodiments, each circular queue 410.1-410.*n* may comprise a memory buffer space divided into identifier cells 412. Each identifier cell may be sized for the byte length of the command identifiers, such as four byte command identifier representing a combination of two Unicode characters, and each circular queue may be sized based on the cell size times the number of command identifiers in the queue (where each command identifier is a fixed length and the buffer memory is divided into equally sized identifier cells). In some embodiments, the number of identifier cells 412 in each circular queue 410 may be based on the number of command identifiers allocated to each processing thread from the global identifier pool. For example, FIG. 4 may represent a global identifier pool of 196 command identifiers divided equally across three processing threads for 64 identifier cells 412 in each circular queue 410. In some embodiments, the number of identifier cells 412 may not be equal across circular queues 410 and each circular queue may be sized differently.

Each circular queue 410 may further include associated pointers configured to indicate the next cell containing an available command identifier and a next empty cell for returning a command identifier. For example, each circular queue 410 may include a next pointer 414 and a return pointer 416 instantiated in additional memory locations that contain references to the memory locations of the identified ID cells for each pointer. In circular queue 410.1, next pointer 414.1 may include the memory location of ID cell 412.2 for the next command identifier to be assigned to an incoming storage command and return pointer 416.1 may include the memory location of ID cell 412.1 for the next returning command identifier. In the example shown, the command identifier from ID cell 412.1 may be the only one currently in use in the corresponding thread. In circular queue 410.2, next pointer 414.2 may indicate ID cell 412.68 and return pointer 416.2 may indicate ID cell 412.65. In the example shown, command identifiers from ID cells 412.65, 412.66, and 412.67 may currently be in use in the corresponding thread. In circular queue 410.*n*, next pointer 414.*n* may indicate ID cell 412.129 and return pointer 416.*n* may indicate ID cell 412.133. In the example shown, command identifiers from ID cells 412.133 to 412.*n* may currently be in use and next pointer 414.*n* has returned to the top of the queue, ID cell 412.129, to indicate the next available command identifier, identifying both the circular nature of circular queues 410 and the reuse of returned command identifiers. Command identifiers from ID cells 412.129-412.132 may have been previously used and command identifiers have since been returned to ID cells 412.129-412.132 (and not necessarily the same command identifiers that were previously in those cells, depending on the order in which commands completed).

Figure 5:
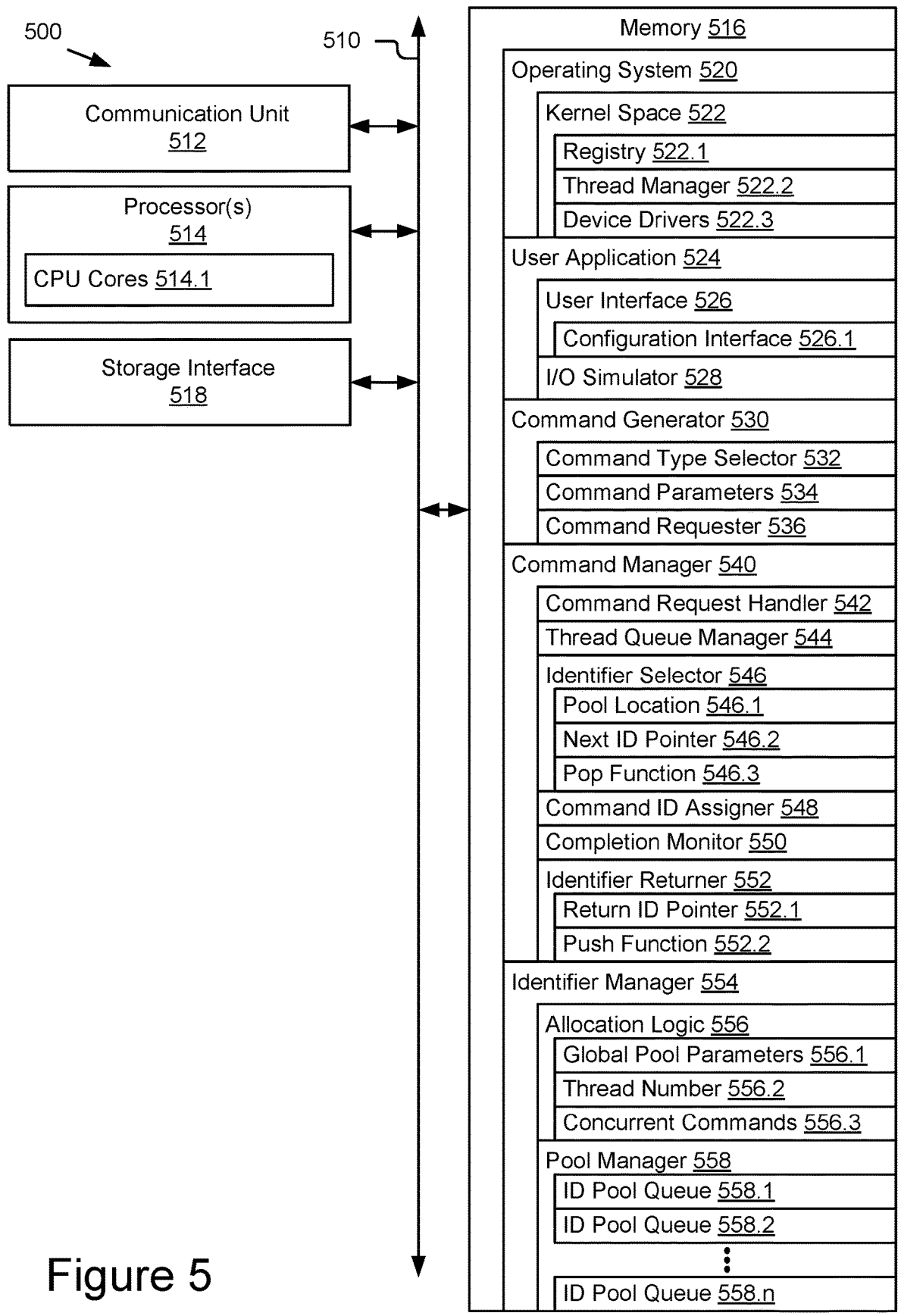
FIG. 5 schematically illustrates some elements of a computing system implementing aspects of FIGS. 1-4 in more detail.

FIG. 5 schematically shows selected modules of a host system 500, such as test system 102, configured to use allocated command identifier pools to manage I/O processing across multiple threads. Host system 500 may incorporate elements and configurations similar to those shown in FIGS. 1-4. For example, host system 500 may be configured as a test system similar to test system 102 in FIG. 1 and the components in memory 516 may include some or all functions of user interface 104, I/O simulator 106, I/O driver 108, device driver 110, and/or power controller 114. Host system 500 may implement allocated command identifier pool system 200 from FIG. 2 using multicore system 300 from FIG. 3 and circular queue system 400 from FIG. 4. While host system 500 may be described in the context of a storage system and, more particularly, an I/O test system for storage devices, allocated command identifier pools in accordance with FIG. 5 may be implemented on a variety of host systems with threaded computer processors and for a variety of command types where processing speed is a material consideration. Implementation of command identifier pools for threaded storage commands in an I/O test system may be a non-limiting example of the use of command identifier pools.

Host system 500 may include a bus 510 interconnecting at least one communication unit 512, at least one processor 514, at least one memory 516, and at least one storage interface 518. Bus 510 may include one or more conductors that permit communication among the components of host system 500. Communication unit 512 may include any transceiver-like mechanism that enables host system 500 to communicate with other devices and/or systems. For example, communication unit 512 may include wired or wireless mechanisms for communicating with other host systems, host system clients, other access systems, and/or one or more storage systems or components, such as storage nodes or controller nodes. Processors 514 may include any type of processor or microprocessor that interprets and executes instructions. Memory 516 may include a random access memory (RAM) or another type of dynamic storage device that stores information and instructions for execution by processor 514 and/or a read only memory (ROM) or another type of static storage device that stores static information and instructions for use by processor 514 and/or any suitable storage element such as a hard disc or a solid state storage element. In some embodiments, processors 514 and memory 516 may include a plurality of distinct compute resources associated with a host system and subcomponents thereof, including subsystems that may incorporate their own processor and memory resources. Storage interface 518 may include one or more storage interface controllers and/or a more generic bus interface and corresponding device driver, such as PCIe or NVMe (over various interface protocols, such as PCI, FC, SAS, etc.).

In some embodiments, host system 500 may include a plurality of CPU cores 514.1 to provide processor(s) 514 executing multiple instructions in parallel. For example, host system 500 may be configured as a multicore system similar to multicore system 300, described above. CPU cores 514.1 may be mapped to a plurality of processing threads and some or all of those threads may be allocated to processing commands with command identifiers in independent computing contexts.

Host system 500 may include a plurality of modules or subsystems that are stored and/or instantiated in memory 516 for execution by processor 514. For example, memory 516 may include an operating system 520 configured to manage hardware and software resources for host system 400. Memory 516 may include a user application 524 configured to provide a user interface and functions for using host system 500, such as an I/O simulator. Memory 516 may include a command generator 530 configured to generate commands for execution by host system 500. Memory 516 may include a command manager 540 configured to organize, execute, and monitor commands in parallel in a threaded computing environment. Memory 516 may include an identifier manager 554 configured to assign command identifiers to individual commands in support of command manager 540.

Operating system 520 may include system software that manages the hardware and software resources of host system 500. For example, host system 500 may be configured with a commercial operating system such as Windows, Linux, OS X, or another operating system to provide a set of services and interfaces that allow other software and hardware systems to interact with the system resources of host system 500. Operating system 520 may include services for accessing and controlling communication unit 512, processors 514, memory 516, storage interface 518, and subcomponents thereof. In some embodiments, operating system 520 may include one or more functions of user application 524, command generator 530, command manager 540, identifier manager 554, and/or underlying services that support those functions.

In some embodiments, operating system 520 may define a kernel space 522 that provides a set of system resources, such as memory space within memory 516, operations or priority in processors 514, bus access to bus 510, and/or configuration and control of communication unit 512 and storage interface 518, that are reserved or prioritized for operating system functions. For example, kernel space 522 may provide a system operating context that is separate from a user operating context, where the user application layer operates in a user space of memory, processor, and interface resources that is separate from kernel space 522 and uses service calls or APIs to access operating system resources in kernel space 522. In some embodiments, kernel space 522 may include registry 522.1, thread manager 522.2, and device drivers 522.3. In some embodiments, kernel space 522 may also include some or all of command generator 530, command manager 540, and/or identifier manager 554.

In some embodiments, kernel space 522 may include registry 522.1 configured for storing information, parameters, configuration settings, options, and other values used by operating system 520 and/or user applications. For example, registry 522.1 may include a database, file, or similar data structure for configuration settings used by operating system 520 to interact with a particular set of hardware and software resources in host system 500.

In some embodiments, kernel space 522 may include a thread manager 522.2 configured to manage access to CPU cores 514.1 and related resources for instruction execution in a plurality of threaded computing contexts. For example, thread manager 522.2 may include a function, service, data structure, and/or related parameters and interface for defining a plurality of processing threads operating in separate computing contexts, generally by mapping each threaded instruction set to a corresponding CPU core and related memory resources. In some embodiments, thread manager 522.2 may be configured to support a determined number of computing threads. For example, thread manager 522.2 may be configured with a thread number value stored in registry 522.1 that identifies a number of computing threads equal to or less than the number of CPU cores 514.1.

In some embodiments, kernel space 522 may include device drivers 522.3 configured to manage one or more hardware devices accessible over bus 510, communication unit 512, and storage interface 518. For example, device drivers 522.3 may include functions, services, data structures, and/or related parameters and interfaces for accessing, controlling, and monitoring input, output, and storage devices, such as internal or external drives, peripherals, displays, input devices, and related physical interfaces and adapters. In some embodiments, device drivers 522.3 may include an operating system specific driver for a storage interface protocol, such as a Windows driver for NVMe storage devices connected via bus 510 and PCIe, FC, SAS, or similar interface connection through storage interface 518. Device drivers 522.3 may include APIs available within kernel space 522 that enable other modules or subsystems within kernel space 522 to access additional functions, services, and/or related parameters and interfaces that may not be available from the user space.

User application 524 may include a set of functions, services, data structures, and/or related parameters and interfaces operating outside kernel space 522 for providing an application to a user of host system 500, either directly or from another computing system through communication unit 512. For example, user application 524 may include any application that makes use of high-performance threaded command execution. In some embodiments, user application 524 may include a plurality of hardware and/or software modules configured to use processor 514 and memory 516 to execute or manage defined operations of user application 524. For example, user application 524 may include a user interface 526 and an I/O simulator 528, among other functional modules.

In some embodiments, user application 524 may include user interface 526, such as a graphical user interface, command line interface, or API to a display application (web browser, system management dashboard, etc.). In some embodiments, user interface 526.1 may include a configuration interface 526.1 for configuring one or more system parameters related to the operation of host system 500. For example, user interface 526 may enable a user to set one or more parameters related to the operation of identifier manager 554. In some embodiments, configuration interface 526.1 may enable a user to enter or select configuration parameters, such as defining the global command identifier pool, selecting a number of threads, identifying a maximum number of concurrent commands, and/or determining the size and format of the command identifiers. This may be in addition to enabling the user to configure parameters related to user application 524 and/or operating system 520. In some embodiments, a configuration message may include a set value command or similar syntax that includes one or more configuration parameter types and a new configuration parameter value. The set value command may be received by user application 524 for setting or changing configuration parameters for command generator 530, command manager 540, and/or identifier manager 554 through a configuration database, file, or similar data structure and/or a corresponding API for configuring those functions.

In some embodiments, user application 524 may be configured to be or include an I/O simulator 528. For example, user interface 526 may provide access to I/O simulator 528 for enabling a user to define I/O patterns or scenarios and test them against target storage devices accessible through storage interface 518. In some embodiments, I/O simulator 528 may include functions, services, data structures, and/or related parameters and interfaces for configuring sets of I/O commands to be processed through command generator 530 and command manager 540. For example, I/O simulator 528 may enable a user to identify data locations, data patterns, operation types, operation rates or volumes, and/or related parameters for the input data for a particular test or simulation, as well as defining other operational parameters and/or configuration parameters for a desired I/O scenario. I/O simulator 528 may also be used to define other parameters of a test session, such as duration, operating parameters to be monitored, output data locations, error handling, etc. For example, I/O simulator 528 may define a series of fields in a form or command syntax that correspond to a set of I/O session parameters for a desired I/O scenario and use user interface 526 to receive input determining some or all of the parameters.

In some embodiments, I/O simulator 528 may define a set of storage operations and/or corresponding commands for a test scenario, generate a corresponding set of storage commands using command generator 530, and provide the set of storage commands to command manager 540 for execution against one or more target storage devices. For example, I/O simulator 528 may include a set of instructions for receiving I/O session parameters, parsing those parameters into a set of storage commands based on a corresponding set of logical rules, sending a corresponding series of command requests to command generator 530, receiving command complete notifications from command manager 540, and accessing, displaying, and/or further processing output data and operational parameters from the I/O session.

Command generator 530 may include a set of functions, services, data structures, and/or related parameters and interfaces configured to generate commands for operations, such as storage operations or other commands handled by command manager 540. For example, command generator 530 may be a sub-module of user application 524 or integrated in an I/O driver with command manager 540 and identifier manager 554 configured to generate and send command requests to an API or service of command manager 540. In some embodiments, command generator 530 may include a plurality of hardware and/or software modules configured to use processor 514 and memory 516 to execute or manage defined operations of command generator 530. For example, command generator 530 may include a command type selector 532, command parameters 534, and a command requester 536, among other functional modules.

In some embodiments, command type selector 532 may include functions, services, data structures, and/or related parameters and interfaces for selecting the command types corresponding to commands supporting the operations of higher-level user applications, such as user application 524, and/or components of operating system 520. For example, I/O simulator 528 may define sets of I/O operations that translate to a series of storage commands. Command type selector 532 may be configured to parse parameters describing the set of I/O operations and translate them into a queue of commands, where each command has a command type and a corresponding set of command parameters based on the command type and command syntax associated with that command type. For example, command type selector 532 may translate the set of I/O operations from I/O simulator 528 into a series of discrete read, write, delete, and similar storage commands. In some embodiments, command type selector 532 may include a plurality of command templates corresponding to the different command types handled by command generator 530 and instructions for applying those templates to the incoming set of I/O operations.

In some embodiments, command parameters 534 may include functions, services, data structures, and/or related parameters and interfaces for determining command parameters for each operation, based on the command type. For example, command parameters 534 may map parameters from the set of I/O operations to the templates and/or syntax of the command type determined by command type selector 532. In some embodiments, command type selector 532 and command parameters 534 may comprise a single operation for parsing incoming operation parameters into formatted commands.

In some embodiments, command requester 536 may include functions, services, data structures, and/or related parameters and interfaces for sending command requests based on the commands generated by command type selector 532 and command parameters 534. For example, command requester 536 may receive a command that includes a command type and complete set of command parameters for defining the command and pass it to command manager 540. In some embodiments, command requester 536 may package the command for an API defined between command generator 530 and command manager 540. For example, command generator 530 may be a user space service that is part of or supports user application 524 and command manager 540 may be part of an operating system service, such as an I/O driver. The I/O driver may define an API or service call that enables a user application, such as I/O simulator 528, to receive command requests based on the commands generated by command generator 530.

Command manager 540 may include a set of functions, services, data structures, and/or related parameters and interfaces configured to manage a plurality of commands for operations in a high-performance threaded computing environment. For example, command manager 540 may be integrated in an I/O driver to execute command operations using processing threads operating in parallel on a plurality of CPU cores 514.1. In some embodiments, command manager 540 may include a plurality of hardware and/or software modules configured to use processor 514 and memory 516 to execute or manage defined operations of command manager 540. For example, command manager 540 may include a command request handler 542, a thread queue manager 544, an identifier selector 546, a command identifier assignor 548, a completion monitor 550, and an identifier returner 552 among other functional modules.

In some embodiments, command requester handler 542 may include functions, services, data structures, and/or related parameters and interfaces for receiving command requests based on the commands generated by command generator 530. For example, command request handler 542 may be configured with an API or other interface for receiving storage command requests from command generator 530 and directing those commands to a plurality of processing queues through thread queue manager 544. In some embodiments, command request handler 542 parses incoming requests, determines their compliance with defined syntax, and passes each command and related set of parameter values to thread queue manager 544. For example, command request handler 542 may include instructions for the logical evaluation of incoming command requests to determine compliant syntax, error handling related to non-compliant command requests, and forwarding commands to thread queue manager 544 for assignment to processing queues.

In some embodiments, thread queue manager 544 may include functions, services, data structures, and/or related parameters and interfaces for allocating commands across a plurality of threaded processing queues. For example, thread queue manager 544 may receive commands from command request handler 542 and allocate each command to a particular processing thread, such as processing threads associated with different CPU cores 514.1. In some embodiments, operating system 520 may enable threaded processing of commands using separate computing context based on different CPU cores 514.1. Each computing context and associated thread may have a command queue allocated to it. In some embodiments, all command queues may be mapped to one thread and corresponding CPU core and thread queue manager 544 may operate on or in conjunction with the corresponding CPU core to manage the command queues, as shown in FIG. 3. In some embodiments, thread queue manager 544 may be configured for to support a number of threads that may be used for command processing. For example, registry 522.1 may include a thread number corresponding to the number of concurrent threads and associated computing contexts operating system 520 and host system 500 are configured to handle. Thread queue manager 544 may use the thread number from the registry to determine the number of command queues to allocate and manage.

In some embodiments, thread queue manager 544 may include logic for allocating each command to one of the command queues and, thereby, one of the processing threads. For example, thread queue manager 544 may include logic for selecting which command queue should receive a next command based on exiting queue depths, command types, and/or other command or operating parameters. In some embodiments, commands may include a parameter that identifies particular threads or command queues, and/or groups of commands to be assigned to the same thread or command queue. Thread queue manager 544 may use command identifiers, a unique identifier assigned to each command, to assist in managing the command queues for each thread.

In some embodiments, identifier selector 546 may include functions, services, data structures, and/or related parameters and interfaces for selecting a command identifier from a global pool of command identifiers used across all threads. In order to reduce processing time, each thread (and associated processor) may be tasked with assigning the command identifier to an incoming command. In some embodiments, each thread and CPU core may be configured with an allocated pool of command identifiers from the global pool of command identifiers to reduce processing delays that may otherwise result from synchronization, locking, cross-checking, or similar mechanisms relying on each thread to communicate with other threads or a shared resource (such as a global identifier pool data structure).

Identifier selector 546 may be instantiated in each thread and processed by the respective CPU cores to select a command identifier from the corresponding pool for that thread. Each instance of identifier selector 546 may be configured with a pool location 546.1 that points to a memory location of the allocated pool of command identifiers for that thread. In some embodiments, each instance of identifier selector 546 may also include a next ID pointer 546.2 that points to a cell or field within the memory location storing the allocated pool for a particular command identifier. Identifier selector 546 may use next ID pointer 546.2 to retrieve the next command identifier to be used from the allocated pool. In some embodiments, identifier selector 546 may be configured with a read or data retrieval function to select a command identifier for use. For example, identifier selector 546 may use a pop function 546.3 to read or retrieve the next command identifier from the cell, field, or position in the allocated pool of command identifiers. Upon completion of the pop function 546.3, the next ID pointer 546.2 may move to the next available command identifier in the allocated pool. In some embodiments, the allocated pool may be structured as a circular queue as described above with regard to FIG. 4/

In some embodiments, command ID assignor 548 may include functions, services, data structures, and/or related parameters and interfaces for assigning the selected command identifier from identifier selector 546. For example, command ID assignor 548 may be instantiated in each thread and processed by the respective CPU cores to assign the selected command identifier as a command parameter and/or in a process table or similar data structure for identifying commands during execution. In some embodiments, command ID assignor 548 may receive the command identifier popped from the allocated pool by identifier selector 546 and write the command identifier to an associated entry for the command in the corresponding command queue. For example, the resulting command entry in the command queue may use the command identifier as a key value associated with a pointer to or data structure containing the command parameters corresponding to the command.

In some embodiments, completion monitor 550 may include functions, services, data structures, and/or related parameters and interfaces for monitoring commands that have been queued and/or initiated for processing by CPU cores 514.1. For example, completion monitor 550 may be instantiated in each thread and processed by the respective CPU cores to signal command completion and/or error conditions. In some embodiments, completion monitor 550 may be configured to listen for commands completed by the corresponding CPU core and identify the completed command by the assigned command identifier. For example, storage commands may be initiated by the corresponding CPU core and sent through a storage device driver to the target storage device. Completion of the storage command may initiate a return message to completion monitor 550 running on the CPU core and thread executing the storage command.

In some embodiments, identifier returner 552 may include functions, services, data structures, and/or related parameters and interfaces for returning the command identifier for a completed command to the allocated pool of command identifiers associated with the thread that processed the command. For example, completion monitor 550 may receive a completion message for a storage command and upon termination of the command, initiate identifier returner 552 to return the command identifier associated with the completed command to the allocated pool. In some embodiments, identifier returner 552 may include a return ID pointer 552.1 that indicated a next available memory location in the allocated pool for receiving the returning command identifier. For example, return ID pointer 552.1 may indicate an empty or used command identifier cell or field for receiving the command identifier. In some embodiments, identifier returner 552 may use a push function 552.2 to return the command identifier to the allocated pool. Push function 522.2 may place the command identifier in the available cell and advance return ID pointer 552.1 to the next available cell.

Identifier manager 554 may include a set of functions, services, data structures, and/or related parameters and interfaces for configuring and managing a plurality of allocated pools of command identifiers for use by command manager 540 and the processing threads. For example, identifier manager 554 may be a configuration service initiated prior to operation of command manager 540, such as set of configuration parameters in registry 522.1, a configuration file or table defined through configuration interface 526.1, and/or a combination thereof. Identifier manager 554 may determine the global pool of command identifiers and allocate them to the number of command identifier pools needed to support execution of command operations using processing threads operating in parallel on a plurality of CPU cores 514.1. In some embodiments, identifier manager 554 may include a plurality of hardware and/or software modules configured to use processor 514 and memory 516 to execute or manage defined operations of identifier manager 554. For example, identifier manager 554 may include allocation logic 556 and a pool manager 558, among other functional modules.

In some embodiments, allocation logic 556 may include a set of functions, services, data structures, and/or parameters and interfaces for determining how a global pool of command identifiers are divided among a plurality of allocated pools of command identifiers. For example, allocation logic 556 may determine the global pool of command identifiers defined for host system 500 and use system configuration parameters, such as a number of threads and a maximum number of concurrent commands supported by host system 500, to allocate the command identifiers into a plurality of command identifier pools assigned to different processing threads.

In some embodiments, allocation logic 556 may access a set of global pool parameters 556.1 that define a number of globally unique command identifier values that may be used by host system 500. For example, global pool parameters 556.1 may include the number of command identifiers, the syntax or configuration of those command identifiers, and a range of unique values, such as a list or array of values or a set of equations or logic for generating the values. In some embodiments, allocation logic 556 may access a thread number 556.2 to determine how many parallel processing threads are supported by allocated command identifier pools. For example, thread number 556.2 may be equal to the number of CPU cores 514.1 or a number less than the number of CPU cores 514.1 where a subset of CPU cores 514.1 are allocated to processing threads. In some embodiments, allocation logic 556 may access concurrent commands 556.3 to determine the maximum number of concurrent commands that need to be supported by each allocated pool. For example, if host system 500 or a relevant component thereof is configured to support 16 concurrent commands, then each allocated pool should include at least 16 command identifiers.

An example embodiment of allocation logic 556 may divide the number of command identifiers in the global pool by the number of supported processing threads, while assuring that each resulting allocated pool has at least a number of command identifiers equal to the maximum concurrent commands they need to support. Allocation logic 556 may further include logic for dividing the unique command identifiers among the allocated pools in the determined numbers. The resulting sets of command identifiers may be provided to pool manager 558 for populating the allocated pools with command identifiers. In some embodiments, global pool parameters 556.1, thread number 556.2, and/or concurrent commands 556.3 may be defined for operating system 520, such as in registry 522.1, or may be user configured through configuration interface 526.1.

In some embodiments, pool manager 558 may include a set of functions, services, data structures, and/or parameters and interfaces for instantiating each of the allocated pools in memory 516 for use by the respective processing threads. For example, pool manager 558 may identify each of the CPU cores 514.1 and corresponding processing threads, request a memory allocation in a memory location mapped to the respective processing thread and sufficiently sized for the allocated pool of command identifiers, and store each set of command identifiers in their corresponding memory locations. In some embodiments, pool manager 558 may receive sets of command identifiers for each processing thread from allocation logic 556 and initialize a corresponding command identifier pool queue. For example, in an example configuration where n processing threads share the global command identifier pool, command ID pool queue 558.1 may receive a first set of command identifiers, command ID pool queue 558.2 may receive a second set of command identifiers, and so on through command ID pool queue 558.n. Command ID pool queue 558.1 may be stored in a memory location associated with a first processing thread and identified to command manager 540 for use by identifier selector 564 and identifier returner 552 for the first processing thread, command ID pool queue 558.2 may be stored in another memory location associated with a second processing thread and identified to command manager 540 for the second processing thread, and so on.

Memory 516 may include additional logic and other resources (not shown) for operating host system 500, operating system 520, user application 524, and underlying services and drivers such as command generator 530, command manager 540 and identifier manager 554. For brevity and ease of understanding, these supporting and conventional aspects of computing systems, operating systems, and user applications have not been included in detail. Processing of a command request by command manager 540 may include any number of intermediate steps that yield at least one data request to the target storage system.

Figure 6:
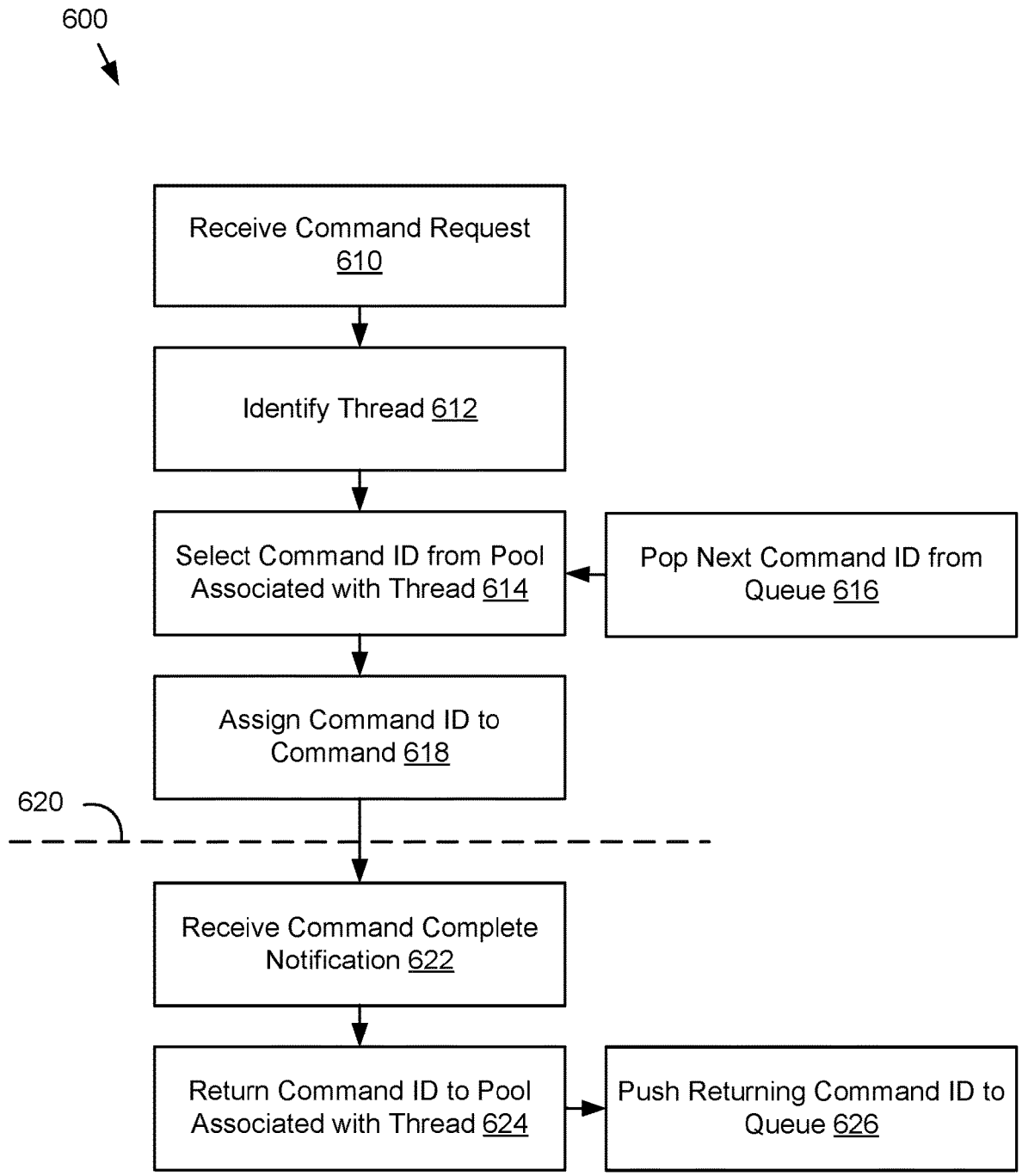
FIG. 6 is a flowchart of an example method of command identifier management using allocated command identifier pools.

As shown in FIG. 6, host system 500 may be operated according to an example method of command identifier management using allocated command identifier pools, i.e. according to method 600 illustrated by blocks 610-626 in FIG. 6.

At block 610, a command request may be received or generated within a host system. For example, a command generator may generate a command request for a user application, pass the command request to a command manager, and the command manager may receive the command request.

At block 612, a thread for processing the command in the command request may be identified. For example, the command manager may include or access a thread manager to assign or otherwise determine the processing thread for executing the command in the command request.

At block 614, a command identifier may be selected from a command identifier pool allocated to the identified thread. For example, the command manager may select a command identifier from the allocated command identifier pool corresponding to the processing thread and associated CPU core. In some embodiments, selection of the command identifier may be instantiated in the computing context of the identified thread and, at block 616, a pop function may be used for selecting the next command identifier from a circular queue of command identifiers supporting the processing thread.

At block 618, the selected command identifier may be assigned to the command for processing. For example, the command manager may assign the selected command identifier to the command for execution by the processing thread in command parameters and/or an associated process table.

At 620, the command may be executed by the processing thread. For example, the command manager may wait for the CPU core to complete execution of the assigned command.

At block 622, a command complete notification or similar message or indicator may be received. For example, the command manager may monitor for command completion and receive a command complete message from the processing thread when the command is complete.

At block 624, the command identifier from the completed command may be returned to the command identifier pool allocated to the processing thread that processed the command. For example, the command manager may identify and return the command identifier from the complete command to the allocated command identifier pool corresponding to the processing thread and associated CPU core. In some embodiments, return of the command identifier may be instantiated in the computing context of the processing thread and, at block 626, a push function may be used for returning the command identifier to the circular queue of command identifiers supporting the processing thread.

Figure 7:
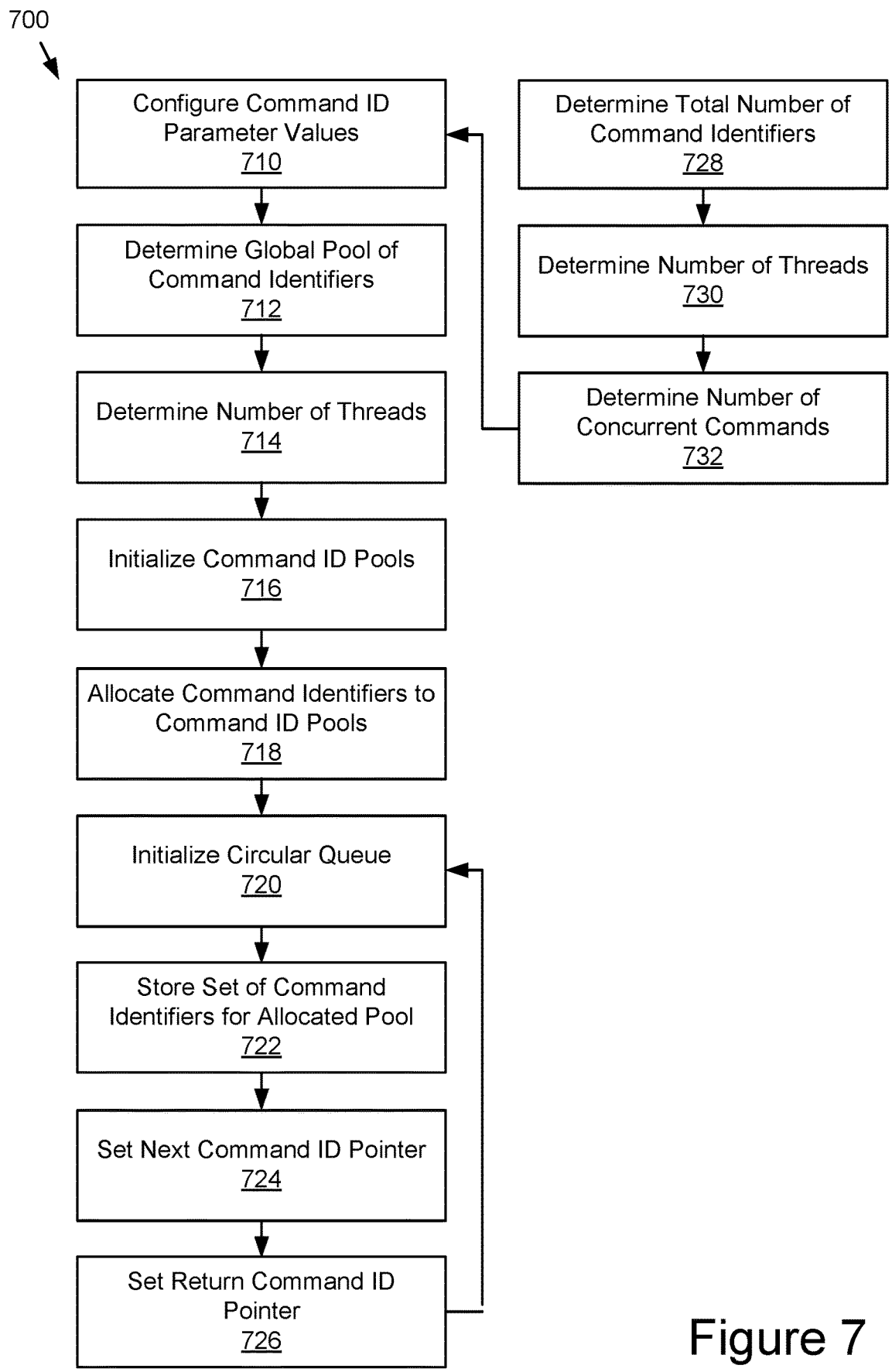
FIG. 7 is a flowchart of an example method of allocating a global storage pool to initiate the method of FIG. 6.

As shown in FIG. 7, host system 500 may be operated according to an example method of allocating a global storage pool to initiate the method of FIG. 6, i.e. according to method 700 illustrated by blocks 710-732 in FIG. 7.

At block 710, command identifier parameter values may be configured. For example, configuration interface may be used to configure an operating system or driver configuration database, file, or similar data structure with relevant host system parameters, such as global command identifier parameters, thread parameters, and concurrent command parameters.

At block 712, a global pool of command identifiers may be determined. For example, an identifier manager may determine the format, range, and number of unique global command identifiers supported by the global command identifier parameters read from the command identifier parameter values configured at block 710.

At block 714, a number of processing threads may be determined. For example, the identifier manager may determine the number of parallel processing threads supported by the configuration of the host system, such as the number of CPU cores allocated to command processing threads.

At block 716, a number of command identifier pools corresponding to the number of processing threads may be initialized. For example, the identifier manager may identify a memory location for each processing thread to store and manage their corresponding command identifier pools.

At block 718, a set of command identifiers from the global command identifier pool may be allocated to each of the command identifier pools. For example, the identifier manager may determine a unique subset of the global command identifier pool for each processing thread, such as by dividing the global command identifier pool equally among the processing threads, allowing for any remainder to be allocated among the processing threads or not.

Blocks 720-726 may be executed for each processing thread and corresponding command identifier pool. At block 720, a circular queue may be initialized for managing the allocated command identifier pool for that processing thread. For example, the identifier manager may allocate a memory space for the circular queue at the memory location for that processing thread identified at block 716.

At block 722, the unique set of command identifiers for the processing thread may be stored in the allocated command identifier pool. For example, the identifier manager may write the subset of command identifiers allocated to that processing thread to cells or fields within the circular queue.

At block 724, the next command identifier pointer may be set for the circular queue. For example, the identifier manager may initialize the next command identifier pointer with the first value in the circular queue.

At block 726, the return command identifier pointer may be set for the circular queue. For example, the identifier manager may initialize the return command identifier pointer with a queue full value and the return command identifier pointer will be set to the first command identifier used once the circular queue is in use.

In some embodiments, a set of configuration values may be received or determined within the host system at blocks 728-732. At block 728, a total number of command identifiers in the global command identifier pool may be received or determined. At block 730, a number of processing threads may be received or determined. At block 732, a maximum number of concurrent commands supported by the system configuration may be received or determined. For example, the total number of command identifiers, the number of processing threads, and/or the maximum number of concurrent commands may be configured as an operating system parameter and/or provided through a configuration interface.

Figure 8:
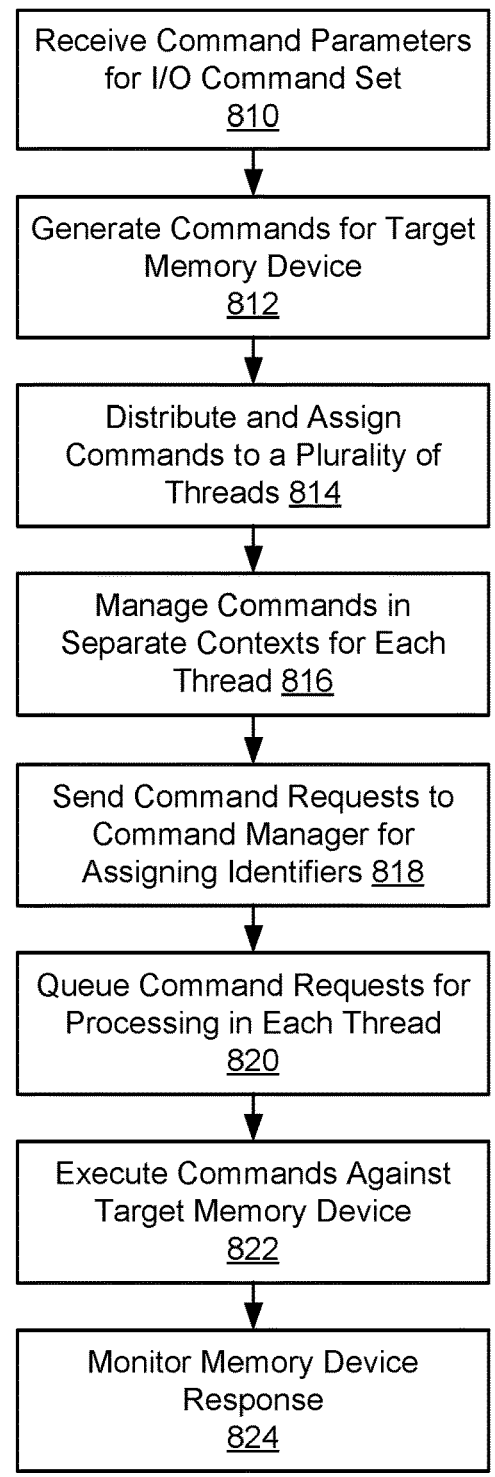
FIG. 8 is a flowchart of an example method of using allocated command identifier pools for threaded I/O processing.

As shown in FIG. 8, host system 500 may be operated according to an example method of using allocated command identifier pools for threaded I/O processing, i.e. according to method 800 illustrated by blocks 810-824 in FIG. 8.

At block 810, command parameters for an I/O command set may be received. For example, an I/O simulator may define an I/O command set and submit it to an I/O driver for execution.

At block 812, storage commands for target memory devices may be generated. For example, a command generator may generate a series of storage commands for target storage devices in accordance with the I/O command set received at block 810.

At block 814, the storage commands may be distributed and assigned to a plurality of processing threads. For example, command manager may allocate the series of storage commands across processing threads for parallel processing by CPU cores.

At block 816, separate computing contexts for managing command execution may be managed for each thread. For example, each processing thread may instantiate some or all functions of the command manager to process their set of storage commands without coordination or dependency on each other processing thread At block 818, command requests for the storage commands may be sent to the command manager for assigning command identifiers. For example, the command manager instantiated in each processing thread may receive and process the command requests assigned to that thread and select and assign a command identifier from the allocated command identifier pool associated with that thread.

At block 820, command requests for each processing thread may be queued in a dedicated command queue for that processing thread. For example, a thread manager may queue commands for processing and each processing thread may select commands from their corresponding queue according to the priority, selection logic, and processing resources of that processing thread.

At block 822, the storage commands may be executed against the target memory devices. For example, each processing thread may, in parallel, select storage commands from their corresponding queues and execute them.

At block 824, memory device response may be monitored. For example, the command manager may monitor for completion of storage commands be the target storage devices and the I/O driver may gather runtime operating parameters to measure and evaluate both individual and aggregate performance of storage command execution for the I/O simulator. In some embodiments, the results of the storage operations corresponding to the storage commands and the operating parameters of their runtime performance, such as completion, error rates, I/O operations per unit time, session time, processor utilization, etc. may be reported through a user application and corresponding user interface.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

The invention claimed is:

1. A system comprising:
a processor;
a memory; and
a command manager stored in the memory and executable by the processor to:
  receive a plurality of command requests, wherein each command request of the plurality of command requests is configured to initiate a corresponding command of a plurality of commands;
  determine, for each command request, a corresponding thread from a plurality of threads to distribute the plurality of commands among the plurality of threads, wherein:
    each thread of the plurality of threads is configured to operate in a separate context that is unaware of each other thread among the plurality of threads; and
    the plurality of command requests includes a first command request for initiating a first command for a first thread selected from the plurality of threads;
  assign, based on the first thread, a first command identifier from a first pool of command identifiers to the first command, wherein:
    each thread from the plurality of threads has a different associated pool of command identifiers; and
    the command manager assigns, to each command of the plurality of commands, a unique command identifier without synchronization across command identifier assignments for the plurality of threads; and
  return, upon completion of the first command, the first command identifier to the first pool of command identifiers.

2. The system of claim 1, further comprising:
an identifier manager stored in the memory and executable by the processor to:
  determine a global pool of command identifiers, wherein the global pool includes a total number of command identifiers;
  determine a number of threads corresponding to the plurality of threads; and
  allocate the total number of command identifiers among a plurality of associated pools of command identifiers, wherein:
    each thread of the plurality of threads corresponds to an associated pool of command identifiers from the plurality of associated pools of command identifiers; and each associated pool of command identifiers includes non-overlapping sets of command identifiers relative to each other associated pool of command identifiers.

3. The system of claim 2, wherein:
the total number of command identifiers is at least a maximum number of concurrent commands for a target system multiplied by the number of threads; and
each associated pool of command identifiers includes a number of unique command identifiers equal to at least the maximum number of concurrent commands.

4. The system of claim 2, further comprising:
a configuration interface stored in the memory and executable by the processor to:
determine the total number of command identifiers;
determine the number of threads; and
configure, using the total number of command identifiers and the number of threads, the plurality of associated pools of command identifiers.

5. The system of claim 1, further comprising:
a plurality of circular queues stored in the memory, wherein each circular queue corresponds to a different associated pool of command identifiers.

6. The system of claim 5, wherein the command manager is further executable to:
pop, from a first circular queue for the first pool of command identifiers, a next command identifier to assign as the first command identifier; and
push, to the first circular queue, the first command identifier to return the first command identifier to the first pool of command identifiers.

7. The system of claim 5, wherein each circular queue of the plurality of circular queues includes:
a buffer space in the memory containing a number of cells equal to a number of command identifiers in that circular queue;
a first pointer indicating a next command identifier to assign; and
a second pointer indicating a target cell for a returning command identifier.

8. The system of claim 1, further comprising:
a storage interface configured for communication with a target memory device; and
a command generator in communication with the storage interface and configured to:
generate a plurality of read/write commands to the target memory device; and
send the plurality of command requests, including the first command request, to the command manager.

9. The system of claim 2, wherein the identifier manager is further configured to allocate, prior to the command manager receiving the plurality of command requests, the total number of command identifiers among the plurality of associated pools of command identifiers to initialize the plurality of associated pools of command identifiers.

10. The system of claim 8, further comprising:
a plurality of central processing unit (CPU) cores, wherein:
each CPU core corresponds to a corresponding thread from the plurality of threads; and
the command manager and the storage interface are configured as drivers operating in a kernel space of an operating system instantiated in the plurality of CPU cores.

11. A computer-implemented method, comprising:
receiving a plurality of command requests, wherein each command request of the plurality of command requests is configured to initiate a corresponding command of a plurality of commands;
determining, for each command request, a corresponding thread from a plurality of threads to distribute the plurality of commands among the plurality of threads, wherein:
each thread of the plurality of threads is configured to operate in a separate context that is unaware of each other thread among the plurality of threads; and
the plurality of command requests includes a first command request for initiating a first command for a first thread selected from the plurality of threads;
assigning, to each command of the plurality of commands, a unique command identifier without synchronization across command identifier assignments for the plurality of threads, wherein:
assigning to each command of the plurality of commands includes assigning, based on the first thread, a first command identifier from a first pool of command identifiers to the first command; and
each thread from the plurality of threads has a different associated pool of command identifiers; and
returning, upon completion of the first command, the first command identifier to the first pool of command identifiers.

12. The computer-implemented method of claim 11, further comprising:
determining a global pool of command identifiers, wherein the global pool includes a total number of command identifiers;
determining a number of threads corresponding to the plurality of threads; and
allocating the total number of command identifiers among a plurality of associated pools of command identifiers, wherein:
each thread of the plurality of threads corresponds to an associated pool of command identifiers from the plurality of associated pools of command identifiers; and
each associated pool of command identifiers includes non-overlapping sets of command identifiers relative to each other associated pool of command identifiers.

13. The computer-implemented method of claim 12, wherein:
the total number of command identifiers is at least a maximum number of concurrent commands for a target system multiplied by the number of threads; and
each associated pool of command identifiers includes a number of unique command identifiers equal to at least the maximum number of concurrent commands.

14. The computer-implemented method of claim 12, further comprising:
determining the total number of command identifiers; and
configuring, using the total number of command identifiers and the number of threads, the plurality of associated pools of command identifiers.

15. The computer-implemented method of claim 11, further comprising:
selecting a first circular queue from a plurality of circular queues stored in memory, wherein each circular queue corresponds to a different associated pool of command identifiers; and
storing the first pool of command identifiers in the first circular queue.

16. The computer-implemented method of claim 15, further comprising:
- popping, from the first circular queue for the first pool of command identifiers, a next command identifier to assign as the first command identifier; and
- pushing, to the first circular queue, the first command identifier to return the first command identifier to the first pool of command identifiers.

17. The computer-implemented method of claim 15, wherein each circular queue of the plurality of circular queues includes:
- a buffer space in a memory containing a number of cells equal to a number of command identifiers in that circular queue;
- a first pointer indicating a next command identifier to assign; and
- a second pointer indicating a target cell for a returning command identifier.

18. The computer-implemented method of claim 11, further comprising:
- generating a plurality of read/write commands to a target memory device; and
- sending the plurality of command requests, including the first command request, for the plurality of read/write commands to a command manager for assigning command identifiers.

19. The computer-implemented method of claim 12, wherein allocating the total number of command identifiers among the plurality of associated pools of command identifiers is performed prior to receiving the plurality of command requests.

20. A system, comprising:
- a processor;
- a memory;
- means for receiving a plurality of command requests, wherein each command request of the plurality of command requests is configured to initiate a corresponding command of a plurality of commands;
- means for determining, for each command request, a corresponding thread from a plurality of threads to distribute the plurality of commands among the plurality of threads, wherein:
  - each thread of the plurality of threads is configured to operate in a separate context that is unaware of each other thread among the plurality of threads; and
  - the plurality of command requests includes a first command request for initiating a first command for a first thread selected from the plurality of threads;
- means for assigning, to each command of the plurality of commands, a unique command identifier without synchronization across command identifier assignments for the plurality of threads, wherein:
  - assigning to each command of the plurality of commands includes assigning, based on the first thread, a first command identifier from a first pool of command identifiers to the first command; and
  - each thread from the plurality of threads has a different associated pool of command identifiers; and
- means for returning, upon completion of the first command, the first command identifier to the first pool of command identifiers.

* * * * *